United States Patent
Järvinen et al.

(10) Patent No.: US 8,021,459 B2
(45) Date of Patent: Sep. 20, 2011

(54) METHOD AND APPARATUS FOR CONTROLLING METAL SEPARATION

(75) Inventors: Aimo Järvinen, Kokkola (FI); Kai Judin, Alaviirre (FI); Harri Natunen, Kokkola (FI); Yrjö Oinonen, Kokkola (FI); Panu Talonen, Kokkola (FI)

(73) Assignee: Outotec Oyj, Espoo (FI)

( * ) Notice: Subject to any disclaimer, the term of this patent is extended or adjusted under 35 U.S.C. 154(b) by 688 days.

(21) Appl. No.: 10/566,596

(22) PCT Filed: Jul. 15, 2004

(86) PCT No.: PCT/FI2004/000455
§ 371 (c)(1),
(2), (4) Date: Jun. 5, 2007

(87) PCT Pub. No.: WO2005/010221
PCT Pub. Date: Feb. 3, 2005

(65) Prior Publication Data
US 2007/0273071 A1  Nov. 29, 2007

(30) Foreign Application Priority Data
Jul. 31, 2003  (FI) .................................. 20031119

(51) Int. Cl.
*C21C 1/04* (2006.01)
*B22F 1/00* (2006.01)

(52) U.S. Cl. ............ 75/375; 75/343; 75/369; 75/374; 75/386; 266/78; 266/90; 266/170

(58) Field of Classification Search ............ 75/343, 75/354, 375–377, 384, 386, 374, 369; 266/78, 266/90, 170
See application file for complete search history.

(56) References Cited

U.S. PATENT DOCUMENTS

| | | | |
|---|---|---|---|
| 4,021,199 A | 5/1977 | Mukae et al. | |
| 4,917,775 A | 4/1990 | Rantapuska et al. | |
| 5,833,830 A * | 11/1998 | Gonzalez Dominguez et al. | 205/337 |
| 6,168,766 B1 | 1/2001 | Imai et al. | |
| 6,606,901 B1 * | 8/2003 | Haanstra et al. | 73/53.01 |

FOREIGN PATENT DOCUMENTS

| | | |
|---|---|---|
| DE | 38 19 020 A1 | 12/1988 |
| DE | 3819020 * | 12/1988 |
| EP | 1 248 102 A1 | 10/2002 |
| FI | 872488 | 12/1988 |
| WO | 96/41039 | 12/1996 |

\* cited by examiner

*Primary Examiner* — Roy King
*Assistant Examiner* — Lois Zheng
(74) *Attorney, Agent, or Firm* — Merchant & Gould P.C.

(57) ABSTRACT

The invention relates to a method and apparatus for controlling a continuous metal removal in conjunction with a zinc preparation process, in which the metal removal is performed in one or more reactors (11*a-c*), in conjunction with the reactor, the redox potential (16*a-c*) and the acidity and/or basicity are measured, and based on the measurement results, the process variables (17*a-c*) of the metal removal are adjusted towards the desired direction. According to the invention, the redox potential measurements (16*a-c*) are performed from the sludge produced in the reactor in conjunction with the outlet pipe of the reactor outside the reactor, and the measuring instrument (16*a-c*) is purified at predetermined intervals.

14 Claims, 2 Drawing Sheets

METHOD AND APPARATUS FOR CONTROLLING METAL SEPARATION

FIELD OF THE INVENTION

Figure 1:
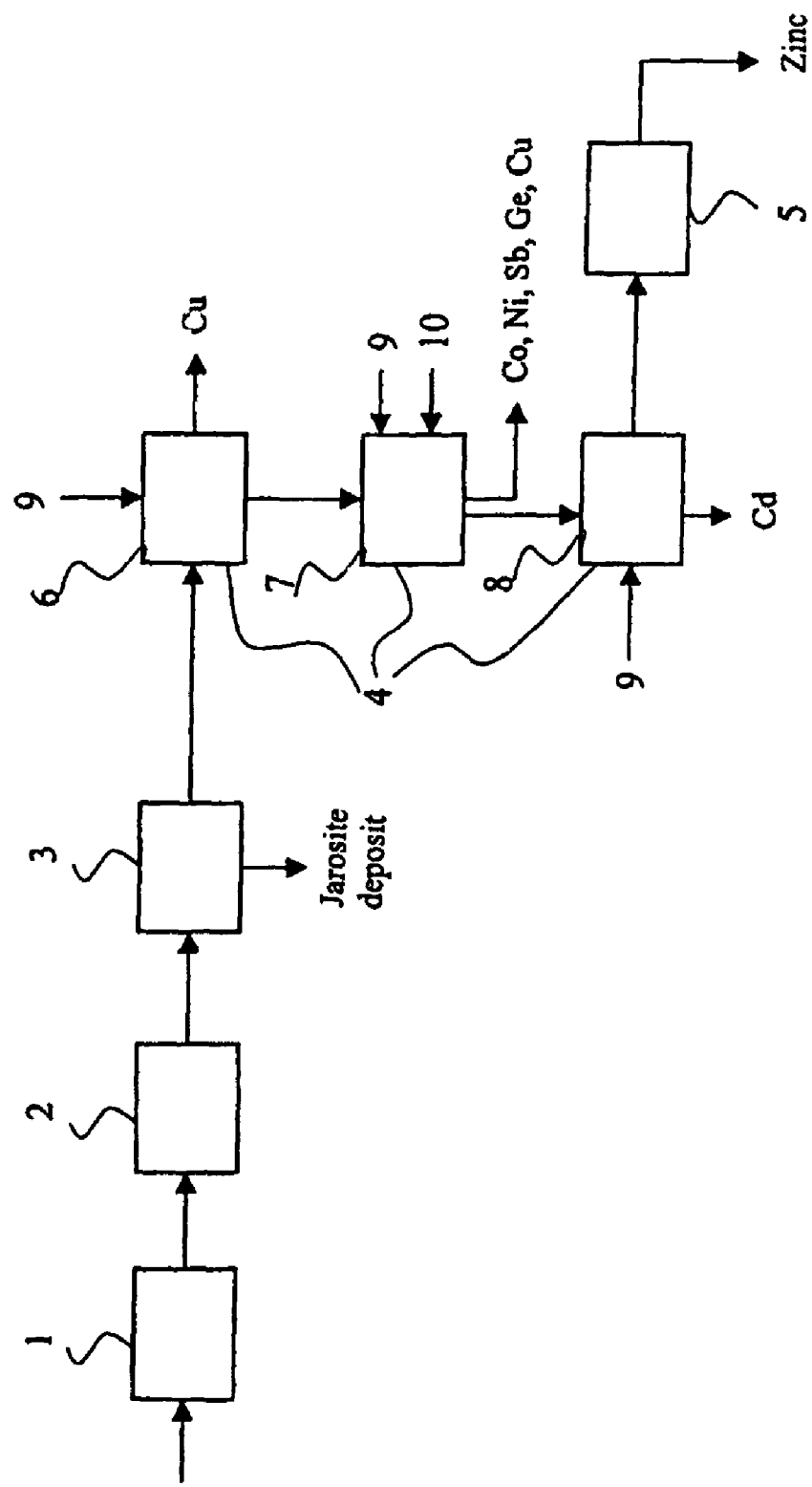

The invention relates to a method as defined in the preamble of claim 1 and an apparatus as defined in the preamble of claim 13 for controlling removal of metal, such as e.g. cobalt, nickel, copper, germanium and cadmium, in conjunction with zinc preparation.

BACKGROUND OF THE INVENTION

In a hydrometallurgic zinc preparation process zinc-bearing ore is concentrated, roasted and dissolved in sulphuric acid. Besides zinc, also copper, cobalt, nickel and cadmium as well as germanium and antimony are released in the dissolution. These metals or semi-metals, i.e. impurities, are removed from the solution by reduction using zinc powder in a solution purification process. The separation of these metals can be performed by precipitating in one or more phases from a zinc-bearing solution in precipitation reactors or the like. After the aforementioned metals have been removed, the zinc is electrolytically reduced from a zinc sulphate solution. In zinc preparation, the impurities must be removed from a zinc-bearing material to achieve a successful and efficient electrolysis to reduce zinc. Particularly Ge and Sb and the metal ions $Co^{2+}$ and $Ni^{2+}$ of the iron group promote the re-dissolving of zinc that stratifies in the electrolysis, resulting in a decrease of the efficiency of electric current.

To improve the separation efficiency of the desired metal and to accelerate the separation in the solution purification process, metallic zinc powder is introduced into the solution, and besides at least one activator. The activator activates the separation of an impurity metal. In addition, the precipitated end product or a property thereof in the precipitation solution can often be used to affect the separation or precipitation rate of metal. The surfaces of the particles of an activator or of a precipitated metal compound have to be purified in order for them to activate the precipitation reaction.

Known in prior art are a number of various ways to optimise metal removal. It is known in prior art to measure the redox potential and the pH values of a metal removal mixture inside a precipitation reactor. By means of the measurement results, variables of the process, such as the consumption of zinc, have been adjusted. However, there is a problem that the measurement electrodes of the redox potential and pH immersed in the reaction mixture get dirty, resulting in an increase in the measurement result errors.

Furthermore, a problem with the continuous metal removal processes has been the adjustment of the zinc powder to be introduced. The adjustment has been difficult, and zinc powder has been introduced in an excess with respect to the reaction.

OBJECTIVE OF THE INVENTION

The objective of the invention is to eliminate the drawbacks referred to above. One specific objective of the invention is to disclose a novel control method and apparatus for enhancing and optimising metal removal in conjunction with zinc preparation. Furthermore, the objective of the invention is to optimise the consumption of zinc powder and to achieve a more purified zinc-bearing solution that is improved in terms of quality in a continuous metal removal.

SUMMARY OF THE INVENTION

The method and apparatus in accordance with the invention are characterised by what has been presented in the claims.

The invention is based on a method for controlling a continuous metal removal in conjunction with a zinc preparation process in which the metal removal is performed in one or more reactors. In conjunction with the reactor, the redox potential and acidity and/or basicity are measured, and based on the measurement results, the process variables of metal removal are adjusted towards the desired direction. According to the invention, the measurements of the redox potential are performed from the sludge produced in the reactor outside the reaction vessel, preferably in conjunction with the outlet pipe of the sludge, and the measuring instrument is purified at predetermined intervals.

A sludge is herein used to mean a solid matter-rich solution the solid matter content of which can vary from a completely solution-like one to a nearly solid one.

In metal removal, i.e. in the removal of cobalt, nickel, copper or cadmium, the target value is to obtain an impurity metal content less than 0.2 mg/l for each metal in a zinc-bearing solution. For germanium and antimony, the target value is less than 0.02 mg/l.

In one embodiment, the redox potential is preferably adjusted to be in the range −570−−650 mV to precipitate cobalt, nickel and germanium, and in the range −480−−550 mV to precipitate copper with respect to a calomel electrode.

The invention has the advantage that the measuring instruments of the redox potential are placed outside the reactor, allowing the measuring instruments to be purified at desired intervals. The fouling of the measuring instruments is prevented at the same time, and the measurement errors due to it, thus enabling more stabile measurements.

The invention enables one to achieve in a metal removal process a smooth and uninterrupted operation which can minimise e.g. the consumption of the zinc powder to be introduced and accurately adjust other process variables. Furthermore, a highly purified zinc solution is obtained for zinc electrolysis. Thanks to the invention, the metals to be removed in metal removal can be precipitated better as a whole.

In one embodiment of the invention, the acidity and basicity of the reactor solution are determined by means of a BT value. The BT value, i.e. the so-called re-titration value, describes the acidity or basicity of a solution; it describes the status of a process more accurately than the pH value. A BT value is used to mean the amount of acidity needed to reach the turning point of titration. The BT value increases as the basicity of the sludge increases. Besides the feed solution, i.e. the zinc preparation solution, the BT value is affected by the amount of zinc powder and the return acid introduced into the process. As the zinc powder is dissolved, either the precipitation of an impurity metal or the generation of hydrogen is obtained as a reduction reaction. The generation of hydrogen raises the BT value. A zinc powder introduced into the process in an excess thus causes an increase in the BT. A high BT, e.g. more than 3.5, causes the fact that non-desired basic zinc sulphates and salts are precipitated on the surface of a soluble zinc powder, which slows down the dissolution of powder particles and thus weakens the purification result. On the other hand, the non-desired precipitates foul the surfaces of the produced end product, thus slowing down the precipitation of impurities. In that case, the introduction of zinc powder must be increased to obtain the desired result, which adds to the costs. Furthermore, the basic salts in question may increase the filtering pressure of the overflow of a concentrator to be used in metal removal, which makes the filtration more difficult and may result in that the solid matter is passed through the filtering fabrics into the filtrate.

Preferably, there is an attempt to obtain a low BT value, about 1.0-3.0, most preferably a BT value of about 2.

The BT value is determined in a manner known per se by adding to the sample a certain amount of a reagent reacting with the sample and by titrating, after the reaction, the remaining reagent using the measurement solution.

By monitoring the BT value and by preferably adjusting it to be low, it is possible to achieve in the metal removal a good purification result of a zinc solution, a uniform solution and a low consumption of zinc powder. Furthermore, the BT value enables one to perform accurate determinations to evaluate the status of the process.

In one embodiment of the invention, the solid matter content of the reactor solution is determined. By monitoring and adjusting the solid matter content to be suitable, preferably to be in the range 10-200 g/l, more preferably 30-100 g/l, a lot of active reaction surface is obtained, which accelerates the precipitation and affects the consumption of zinc powder.

In one embodiment of the invention, the introduction of zinc powder into the metal removal reactor is regulated based on the measurement results. Zinc powder is preferably introduced 0.3-0.9 g, more preferably about 0.4-0.7 g per a feed liter of zinc solution.

Preferably, besides the introduction of zinc powder, the redox potential, the acidity and/or basicity of the solution, the solid matter content and/or the temperature of the reactor are adjusted based on the measurement results.

By regulating the temperature it is possible to prevent the formation of precipitating, non-desired substances. The temperature is optimised to be suitable by taking into account that e.g. in cobalt removal, gypsum is precipitated at too low a temperature, and at too high a temperature, anhydrite is starting to be precipitated. The precipitation of these solids can, however, be reduced by removing from the process big-sized solid matter particles, e.g. by classification.

In one embodiment of the invention, the metal removal means cobalt removal. In one embodiment, the metal removal is performed at least in two reactors connected in serial.

In one embodiment of the invention, the measuring instrument is arranged in conjunction with the outlet pipe of the reactor or in conjunction with the connecting pipe between the reactors. In one embodiment, the measuring instrument of acidity/basicity is arranged in conjunction with the reactor vessel.

In one embodiment of the invention, the measurement of the redox potential is performed by means of a measurement electrode. Preferably, arranged in the outlet pipe of the reactor or in the connecting pipe between the reactors is a junction line, into which the electrode has been placed.

In one embodiment of the invention, the measuring instrument is regularly cleaned, most preferably at intervals of 1-2 hours to prevent fouling.

In one embodiment of the invention, in conjunction with each reactor, measurements are performed that control, for each reactor specifically, the adjustment of the desired process variable(s). In one preferred embodiment, after each reactor there is the measurement of the redox potential, which controls the reactor-specific introduction of zinc powder.

In an alternative solution, it is possible to manually introduce the desired amount of zinc powder into the reactor.

Further, the invention relates to an apparatus for controlling a continuous metal removal in conjunction with a zinc preparation process in which the metal removal is performed in one or more reactors, the apparatus comprising at least one measuring instrument for measuring the redox potential and acidity and/or basicity in conjunction with the reactor, at least one adjusting device for adjusting the process variables of the metal removal towards the desired direction based on the measurement results, and at least one control device for forwarding the measurement results from the measuring instrument to the adjusting device. According to the invention, the measuring instrument of the redox potential is arranged outside the reactor vessel, and is placed in conjunction with the pipe connected to the reactor, through which pipe the sludge produced in the reactor flows, and the apparatus includes purification means for purifying the measuring instrument at predetermined intervals.

The apparatus in accordance with the invention is simple in structure and thus advantageous to implement.

In one embodiment of the invention, the invention relates to the use of a method and apparatus in accordance with the invention in a cobalt removal process in conjunction with zinc preparation. In conjunction with a cobalt removal process it is possible to precipitate e.g. copper, nickel, germanium and antimony. In a cobalt removal process, e.g. arsenic oxide as an activator is added to a solution containing residual copper (e.g. 50-300 mg/l) from copper removal to accelerate the precipitation of metals from a zinc-bearing solution. In addition, reducing zinc powder is added to the solution, in which case copper arsenide is precipitated. Copper arsenide reacts in the solution with cobalt and nickel in the presence of zinc powder to form cobalt and nickel arsenide For example, in the presence of arsenic, cobalt and nickel can be precipitated relatively fast, in about 1.5 hours, to form cobalt and nickel arsenide. The produced deposit, such as cobalt arsenide deposit, is recycled in the reactor as a solid matter to optimise the reaction rate and precipitation surface. There must be in the process enough solid matter on whose surface the impurities are precipitated. The surface must consist of purified, metallic copper, or copper, cobalt or nickel arsenide to improve and activate the precipitation. The impurities that are precipitated on the surface of the particles, such as basic zinc sulphates and calcium sulphates, passivate the deposit and increase the particle size.

Alternatively, the method and apparatus in accordance with the invention can also be used to separate or remove other metals in conjunction with a zinc preparation process.

LIST OF FIGURES

Figure 2:
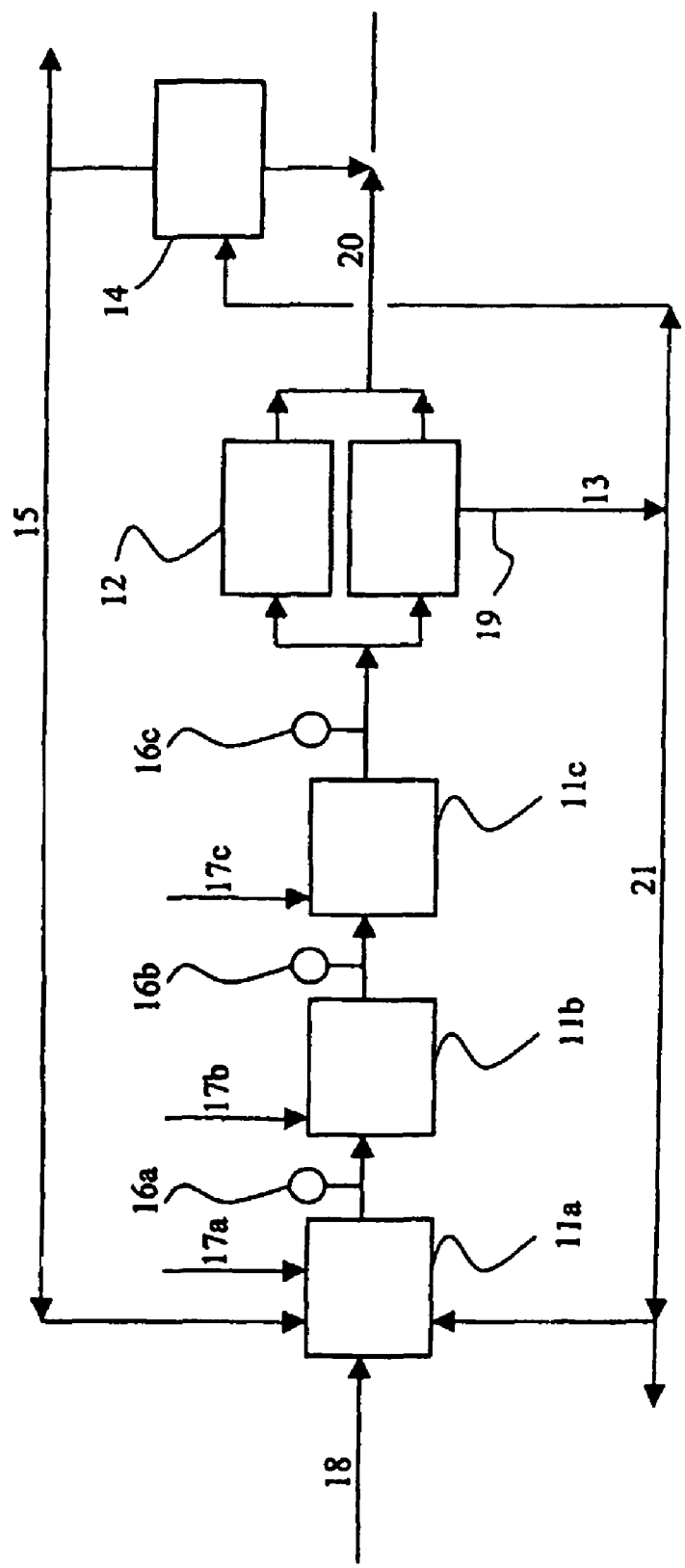

In the following section, the invention will be described by means of detailed embodiment examples with reference to the accompanying drawings, in which FIG. 1 is a block diagram illustrating a hydrometallurgic zinc preparation process; and FIG. 2 is a diagram illustrating one device embodiment in accordance with the invention in a cobalt removal process.

DETAILED DESCRIPTION OF THE INVENTION

FIG. 1 shows a hydrometallurgical zinc preparation process. In a hydrometallurgical zinc preparation process, zinc ore is first concentrated 1, and the zinc concentrate is roasted 2. The purpose of the roasting 2 is to bring the sulphide zinc into a soluble oxide form. After the roasting 2, the zinc roast is dissolved into sulphuric acid in one or more phases 3, whereby the zinc oxides react to form zinc sulphate. In a dissolution phase 3, iron is precipitated as a basic sulphate, i.e. as a jarosite precipitate, götite or hematite. In the dissolution phase 3, the dissolved impurities, e.g. copper, cobalt, nickel, germanium, antimony and cadmium, are removed from the zinc sulphate solution in solution purification 4, which is preferably performed in three phases 6, 7, 8. In the first phase 6, a main part of copper is removed by means of zinc dust 9. In the second phase 7, cobait, nickel, germanium, antimony and the rest of the copper are precipitated from the solution by means of arsenic trioxide 10 and zinc dust 9 as metal arsenics, whereby zinc functions as a reducer. In the third phase 8, cadmium is removed by means of zinc dust 9. The purified zinc solution is introduced via cooling into electrolysis 5, wherein it is mixed with a circulating electrolyte. In the electrolysis 5, the zinc is reduced for cathodes to form metals by means of electric current. The roasting, dissolution and electrolysis are performed in a manner known per se in the field, so they are not described more fully herein.

In the cobalt removal shown in FIG. 2, cobalt, nickel, germanium, antimony and residual copper are precipitated from the zinc sulphate solution 18 in many phases in three reactors 11a, 11b and 11c connected in serial. Arranged in conjunction with the junction lines of the outlet pipes or connecting pipes of the reactors 11a-c are measurement electrodes 16a-c for the automatic measurement of the redox potential of the sludge produced in the reactor. The measurement electrodes 16a-c of the redox potential are connected to a control device (not shown in the figure) which transmits the measurement results to the adjustment means 17a-c of the feeding devices of zinc powder, for each reactor specifically, for introducing the desired amount of zinc powder into the reactors 11a-c, as the process is concerned. The electrodes are regularly washed at intervals of about an hour to prevent their fouling and the measurement errors due to it.

In the device as shown in FIG. 2, the BT value is determined using automatic titrators from the solution inside the reactors. The titrators are connected to a control system, whereby the measured BT values are transmitted to the control system, which controls the acidity and basicity of the sludge in the reactors 11a-c towards the desired direction.

Alternatively, the Redox potentials and BT values can be determined manually, whereby they must be input into the control system, or the desired process variables must be manually adjusted based on them.

The zinc powder is introduced into the cobalt removal reactors 11a-c by means of feeding devices 17a-c known per se in the field, e.g. by means of screw feeders. It is not advantageous to introduce zinc powder in a big stoichiometric amount in excess due to the creation of non-desired side reactions; an excess of zinc does not thus add to the precipitation rate. In cobalt removal, the redox potential, temperature and the precipitation surface of the reactor affect the precipitation rate.

The cobalt removal process includes, in addition, two concentrators 12 connected in parallel, which are arranged after the reactor 11c and of which only one at a time is used. Arranged in the output 20 of the overflow of the concentrator is a filter press for purifying the overflow from solid matter.

The cobalt arsenide sludge produced in the precipitation reactors 11a-c and precipitated in the concentrator 13 is settled on the bottom of the reactor, from which it is led out of the reactor via the junction line 19 of the concentrator 12 as an underflow, and is recycled back to the first reactor 11a. The cobalt sludge 13 can be classified using a classification device 14, and the desired fraction 15 from the standpoint of the process can be recycled back to the first reactor 11a of the process. The coarse fraction, separated using the classification device and harmful from the standpoint of the invention, is removed from the process via the filters of the overflow. Alternatively, the entire sludge fraction 21 can be recycled back to the reactor 11a, or lead out of the process. A cobalt deposit is preferably recycled in such a manner that the solid matter content of a cobalt removal reactor(s) is about 10-200 g/l, more preferably 30-100 g/l.

Example 1

In this test, a continuous cobalt removal process was examined. In the test performed under process conditions, zinc powder was introduced by means of a screw feeder into five metal removal reactors arranged in parallel. Arranged after each reactor, or in the connecting pipe between them were the measurement electrodes of the redox potential, which were used to measure the redox potential of the sludge coming out of the reactor for each reactor specifically. The measurement results controlled the introduction of zinc powder into the reactors for each reactor specifically. The measurement electrodes were washed at intervals of an hour to prevent their fouling.

The acidity and basicity of the reactor solutions were measured by means of the BT value using a titration method known per se. The BT value ranged between 2.5-3.5.

In the process, a consumption of zinc powder of about 0.6-0.7 g was achieved.

However, a high BT caused, soon after the starting of the process, the precipitation of the zinc silicate, i.e. hemimorphite. The zinc and silica concentrations of the cobalt deposit in the process increased. The presence of hemimorphite caused zinc losses, since the dissolving of zinc from the deposit was not successful at the same time due to the filtration difficulties caused by silica. The problem could be solved by reducing the BT value to about two.

Example 2

In this test, a continuous cobalt removal was examined under conditions similar to those of Example 1, but the BT value was about 2.

In the test, an uninterrupted run of more than 6 months was achieved, and furthermore as a result of the process, a better and more uniform zinc-bearing solution. The concentrations of cobalt, nickel and copper measured from the zinc solution were principally less than 0.2 g/l, and those of germanium, antimony and arsenic less than 0.02 mg/l.

Based on the process tests, it was observed that the method and apparatus in accordance with the invention enabled one to achieve a small consumption of zinc powder in conjunction with metal removal reactors compared with other zinc preparation processes. It was possible to precipitate copper and cadmium in the solution purification, i.e. metal removal, practically using a stoichiometric amount of zinc powder. To sufficiently precipitate cobalt and nickel, a slight excess of zinc powder was needed, the amount of the introduction of zinc powder being about 0.5 g/l. In other corresponding prior-art cobalt removing processes, the amount of the introduction of zinc powder was multiple, about 3-4.5 g/l.

The apparatus and method in accordance with the invention are applicable, in various embodiments, to the control of the removal of various metals in conjunction with a zinc preparation process.

The embodiments of the invention are not limited to the examples referred to above, instead they can vary within the scope of the accompanying claims.

The invention claimed is:

1. A method for controlling a continuous cobalt removal in conjunction with a zinc preparation process, in which the cobalt removal is performed in at least two reactors comprising a first reactor and a second reactor connected in series and having a connecting pipe between the two reactors and an outlet pipe from the second reactor, in conjunction with the two reactors, redox potential and acidity and/or basicity are measured, and process variables of the cobalt removal are adjusted toward a desired direction based on the measurement results, wherein the measurement of the redox potential is performed on a sludge produced in the two reactors and is performed in the connecting pipe and in the outlet pipe, and measurement of the acidity and/or basicity are performed on a reactor solution and are determined by means of a BT value, and a measuring instruments of the redox potential are purified at predetermined intervals, and based on the measurement results, introduction of zinc powder into the cobalt removal reactors is adjusted to provide a BT value of about 1.0 to 3.0.

2. The method as defined in claim 1, wherein a solid matter content of the reactor solution is determined and adjusted to be suitable.

3. The method as defined in claim 2, wherein based on the measurement results, the redox potential of the sludge, the acidity/basicity of the solution, the solid matter content of the solution and/or the temperature of the reactor are adjusted.

4. The method as defined in claim 1, wherein the measuring instrument of acidity and/or basicity is arranged in conjunction with the two reactors.

5. The method as defined in claim 1, wherein the measurement of the redox potential is performed using a measurement electrode.

6. The method as defined in claim 1, wherein the measuring instrument is regularly washed.

7. The method as defined in claim 1, wherein in conjunction with each reactor, measurements are performed that control the adjustment of the desired process variable, for each reactor specifically.

8. The method defined in claim 1, wherein the measuring instrument is regularly washed at intervals of 1-2 hours.

9. The method as defined in claim 1, wherein the outlet pipe comprises a connecting pipe to a third reactor.

10. An apparatus for controlling a continuous cobalt removal in conjunction with a zinc preparation process, in which the cobalt removal is performed in at least two reactors comprising a first reactor and a second reactor connected in series and having a connecting pipe between the two reactors and an outlet pipe from the second reactor, the apparatus comprising at least one measuring instrument for measuring the redox potential and acidity and/or basicity in conjunction with the at least two reactors, at least one adjustment device for adjusting process variables of the cobalt removal toward a desired direction based on the measurement results, and at least one control device for forwarding the measurement results from the at least one measuring instrument to the at least one adjustment device, wherein the measuring instruments of the redox potential is are arranged in the connecting pipe and in the outlet pipe, and placed in conjunction with a pipe connected to the one or more reactors, via which pipe sludge produced in the one or more reactors flows out, and the apparatus comprises a determination device of BT value for determining the acidity and/or basicity of a reactor solution, and the apparatus comprises purification means for purifying the at least one measuring instrument of the redox potential at predetermined intervals, and based on the measurement results, introduction of zinc powder into the cobalt removal reactors is adjusted to provide a BT value of about 1.0 to 3.0.

11. The apparatus as defined in claim 10, wherein the apparatus comprises a feeding device for introducing zinc powder into the one or more reactors, and the feeding device is connected to the at least one adjustment and/or at least one control device.

12. The apparatus as defined in claim 10, wherein the measuring instrument of acidity and/or basicity is arranged in conjunction with the two reactors.

13. The apparatus as defined in claim 10, wherein the measuring instrument of the redox potential comprises at least two measurement electrodes.

14. The apparatus as defined in claim 10, wherein the outlet pipe comprises a connecting pipe to a third reactor.

* * * * *